United States Patent [19]

Risler

[11] Patent Number: 4,656,042
[45] Date of Patent: Apr. 7, 1987

[54] METHOD FOR SEPARATELY PACKAGING FOOD COMPONENTS

[76] Inventor: Pierre Risler, Allée des 4 sous, 95160 Montmorency, France

[21] Appl. No.: 771,144

[22] Filed: Aug. 29, 1985

Related U.S. Application Data

[62] Division of Ser. No. 468,970, Feb. 23, 1983, abandoned.

[30] Foreign Application Priority Data

Mar. 3, 1982 [FR] France .................... 82 03513

[51] Int. Cl.⁴ .................. B65B 47/02; B65B 55/14; B65B 7/28; B65B 29/00
[52] U.S. Cl. ............................ 426/396; 53/449; 53/453; 53/474; 53/478; 53/485; 426/398; 426/407; 220/20
[58] Field of Search .............. 426/120, 124; 220/20; 206/526, 216; 53/449, 474, 453, 485, 478, 246, 282

[56] References Cited

U.S. PATENT DOCUMENTS

| | | | |
|---|---|---|---|
| 1,514,379 | 11/1924 | Fleischer | 426/120 |
| 2,236,641 | 4/1941 | Karmen | 426/120 |
| 2,279,471 | 4/1942 | Laycock | 426/124 |
| 2,447,170 | 8/1948 | Dunmire | 426/108 |
| 2,487,594 | 11/1949 | Rudnick | 426/124 |
| 2,591,578 | 4/1952 | McNealy et al. | 426/124 |
| 2,705,579 | 4/1955 | Mason | 53/453 |
| 2,745,752 | 5/1956 | Peters | 426/119 |
| 2,786,769 | 3/1957 | Greenspan | 426/120 |
| 2,965,496 | 12/1960 | Serdar | 426/120 |
| 3,054,679 | 9/1962 | Bradford | 426/106 |
| 3,070,275 | 12/1962 | Bostrom | 426/120 |
| 3,149,981 | 9/1964 | Sanni . | |
| 3,179,320 | 4/1965 | Ward | 426/115 |
| 3,240,610 | 3/1966 | Cease | 426/114 |
| 3,281,251 | 10/1966 | Templeton | 426/309 |
| 3,305,368 | 2/1967 | Bourelle | 426/120 |
| 3,328,177 | 6/1967 | Fine | 426/120 |
| 3,394,861 | 7/1968 | Truax | 426/120 |
| 3,417,895 | 12/1968 | Penton | 426/120 |
| 3,418,140 | 12/1968 | Fisher | 53/453 |
| 3,459,295 | 8/1969 | Cousar | 220/20 |
| 3,481,100 | 12/1969 | Bergstrom | 53/453 |
| 3,514,029 | 5/1970 | Powell | 426/124 |
| 3,547,658 | 12/1970 | Melnick | 426/120 |
| 3,561,668 | 2/1971 | Bergstrom | 426/124 |
| 3,563,768 | 2/1971 | Melnick | 426/120 |
| 3,743,520 | 7/1973 | Croner | 426/120 |
| 4,018,355 | 4/1977 | Ando | 426/120 |
| 4,279,354 | 7/1981 | Conti | 220/20 |
| 4,314,650 | 2/1982 | Cillario | 426/120 |
| 4,348,421 | 9/1982 | Sakakibara et al. | 426/120 |
| 4,399,158 | 8/1983 | Bardsley et al. | 426/120 |
| 4,447,460 | 5/1984 | Lewis et al. | 426/456 |

FOREIGN PATENT DOCUMENTS

| | | | |
|---|---|---|---|
| 15461 | 9/1980 | European Pat. Off. | 53/474 |
| 1378140 | 12/1974 | United Kingdom | 426/396 |
| 1451094 | 9/1976 | United Kingdom | 426/120 |

OTHER PUBLICATIONS

Food Technology 8/70, p. 896t, Brockman.

*Primary Examiner*—Steven Weinstein
*Attorney, Agent, or Firm*—Vogt & O'Donnell

[57] ABSTRACT

A method of forming a container in order to package separately components of a food product which would be incompatible in admixture during prolonged storage which in one embodiment comprises simultaneously forming and shaping a pot, or cup, and a tray wherein the base wall and boundary wall of the pot are disposed within the confines of the sidewalls of the tray, thereby forming two separate compartments, wherein the opening of the pot and tray are located on opposing sides of a horizontal plane defined by the base of the tray. The components of the food product are packaged by filling the pot with one food product component and by filling the tray with a second food product component and sealing each with a lid.

In an embodiment wherein the pot and tray are separately formed, the tray is formed with an annular rib for positioning of the filled pot and each are sealed by a single lid in the method disclosed.

5 Claims, 6 Drawing Figures

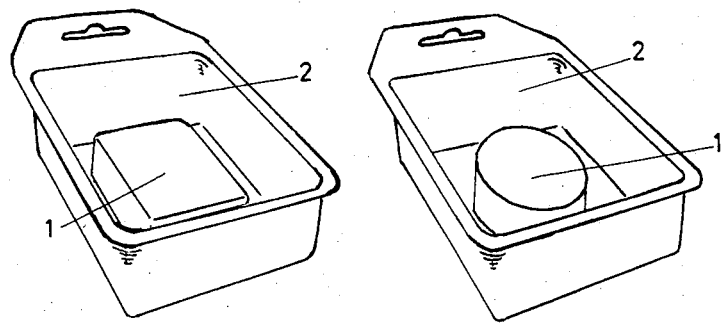
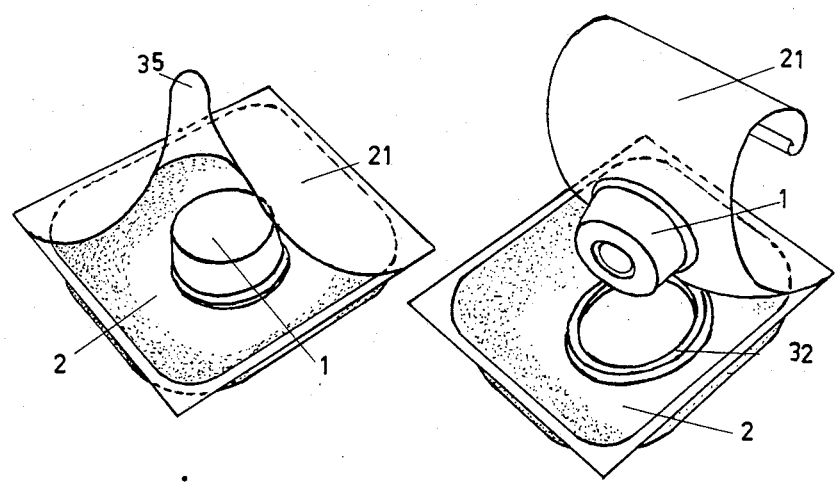

METHOD FOR SEPARATELY PACKAGING FOOD COMPONENTS

This application is a divisional application of application Ser. No. 06/468,970, filed Feb. 23, 1983, now abandoned.

This invention relates to a package and to a method of packaging for a food product comprising two components which are kept separately until they are used.

French Pat. No. 2,025,269 and U.S. Pat. Nos. 3,563,768 and 3,149,981 relate to the packaging in sachets having separate compartments of constituents of a culinary product or a beverage or seasoning ingredients. In such sachets, the separation is usually effected from a single sachet by soldering the walls thereof along a median line or by the insertion of a membrane between the walls. These packages have the disadvantage of being badly adapted to such products which, for example are in pieces and for which the metering and the filling operations are difficult, and the packages also have the disadvantage of being inconvenient when used, as some of the products often remain stuck to the walls or in the corners of the sachet compartments.

The package according to the present invention overcomes these disadvantages. It is characterised in that it comprises a container defined by a pot, or cup, disposed within a tray sealed by at least one lid and forming two separate compartments.

The present package is particularly well adapted to food products comprising two components of a different nature, each component having to be packed in a manner adapted to its nature.

This means that these components have physical, chemical or organoleptic properties which render them incompatible in admixture during prolonged storage, for example a great difference in granulometry, density, fluidity, humidity, hygroscopicity, adsorbing power, colour, flavour or predisposition to the Maillard reaction or to an enzymatic degradation. The following may be mentioned, for example: a beverage and sugar, a milk dessert and a fruit garnish, a prepared meal comprising pieces of meat, fish, eggs, vegetables and a sauce, and a soup comprising a garnish in pieces and a powder mass, for example as described in French Patent Application No. 82 03513.

The accompanying drawings which are provided by way of example illustrate the package and the method of packaging a product comprising a garnish of pieces of food and a powder mass.

BRIEF DESCRIPTION OF THE DRAWINGS

FIGS. 1a and 1b illustrate schematic and perspective views of two variants of the open package.

FIGS. 2a and 2b are schematic and perspective views of variants of the package with the lid being opened, and FIGS. 3 and 4 schematically illustrate two variants of the packaging method.

Figure 3:
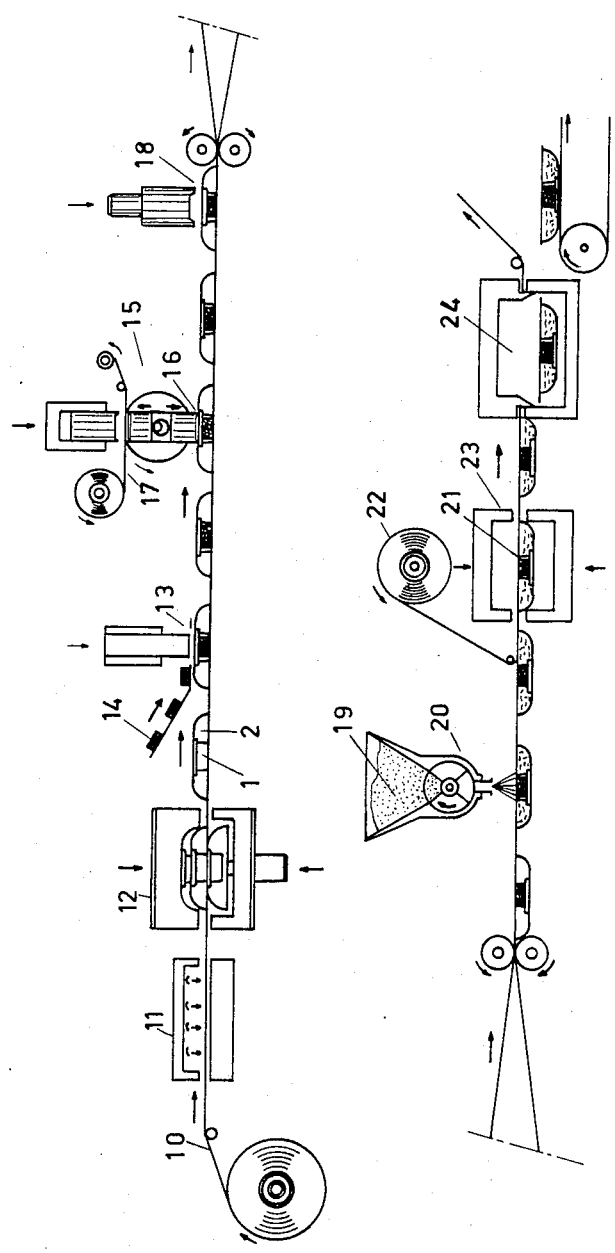

According to FIG. 3, the container comprises a pot or cup, 1 and a tray 2 which are simultaneously shaped by intermittently stamping at 12 from a continuous thermoplastic strip 10 which is heated at 11. As illustrated, the opening of the pots is upwardly facing and is first filled at 13 a component of a food product such as with a garnish 14 which is preferably compacted. Lids 16 which are cut out from a rolled strip 17 are positioned at 15 and are then bonded at a station 18. It is possible to pass strip 10, having a plurality of containers formed therefrom which are connected by unformed portions of advancing strip 10, through a water tank, which is not shown, to pasteurize the garnish. The strip 10 and the formed containers of which the pots are filled and sealed, are returned so that the trays 2 have their opening at the top. A second component of the food product such as a powder mass 19 is metered in at 20 filling the trays 2 which then are advanced and sealed by soldering lids 21, originating from a rolled strip 22, at a station 23. Then each sealed container package is cut off at 24 from strip 10, while the sealed containers and the waste resulting from the cutting operation of the strips are removed.

Figure 4:
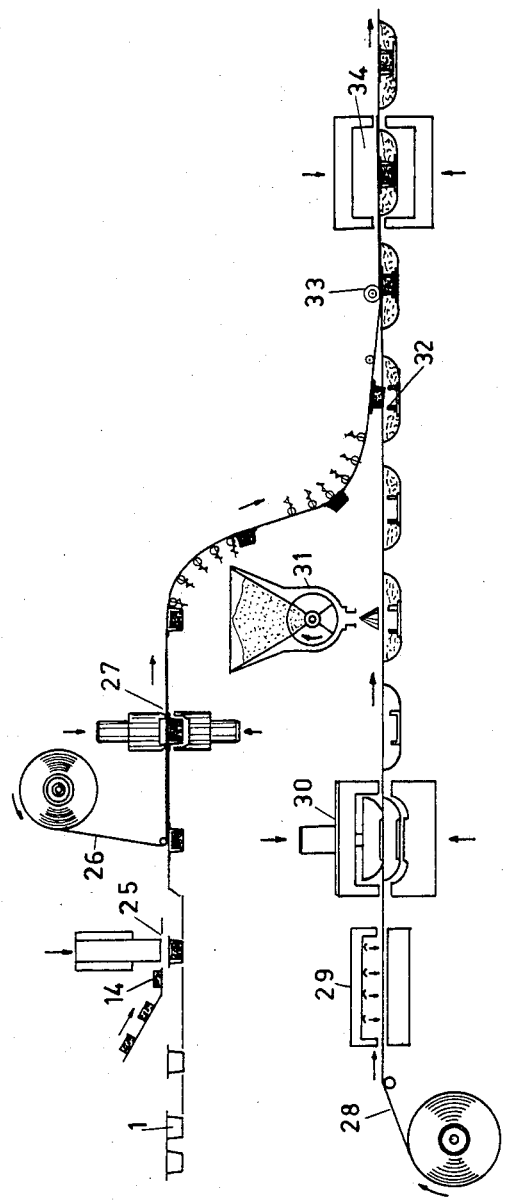

According to FIG. 4, pots are preformed from a thermoplastic material and have their opening, as illustrated, at the top. They are filled at 25 with a component of a food product such as a garnish 14 which is preferably compacted, and then the pots are sealed by means of a lid obtained from a rolled strip 26 to which they are soldered at a station 27. The dimensions of the strip forming the sealed lid of the pot are such that its size is at least sufficient to also cover the tray opening. A plurality of sealed pots are interconnected by the lid strip and advance continuously. The garnish may then be pasteurized as indicated above. The trays 2 having their opening at the top, as illustrated, are formed at 30 from another rolled strip 28 which is heated at 29, and then a second component of the food product such as a powder mass is metered in at a station 31. The continuous strips 26 and 28 carrying, respectively, the pots 1 and the trays 2 move in synchronism and come to be positioned one on top of the other so that the pots 1 are positioned exactly in the centre of the trays 2. To facilitate positioning the pots an annular rib 32, having an inner periphery capable of receiving and surrounding a formed pot, will advantageously be provided on the bottom of the trays 2. This rib is also used to maintain the power mass on the outer periphery of the rib. A roller 33 will preferably assist in the insertion of the pots 1. Finally, the strips 26 and 28 are soldered at 34, the rest of the operations, cutting and removal, being carried out as illustrated in FIG. 3.

The pots, trays and lids are made of materials which are tight with respect to moisture, light and oxygen. By way of example, the trays and pots are thermoformed from a multilayer material comprising a film of polyvinyl chloride charged with titanium dioxide and a film of polyvinylidene chloride or a complex based on polypropylene charged with titanium dioxide and a median layer of carbon black. The lids advantageously consist of a film of aluminium counter-covered with polyester, polypropylene or polyamide.

The lids preferably have a pull-off tongue 35 to facilitate the opening thereof.

The pots are preferably in the form of a truncated cone or in the form of a truncated pyramid having a rectangular base, i.e., they have a taper facilitating the proportioning of the garnish and the removal thereof for use.

The drawings illustrate the garnish in an already shaped condition at the moment of filling. In a variant, it is possible to meter the pieces into the pots and to compact them directly inside the alveoli.

Moreover, the garnish and the powder mass may advantageously be packaged under an inert atmosphere and away from light.

I claim:

1. A method of separately packaging two components of a food product comprising:
    (a) continuously forming a plurality of unconnected pots and advancing and filling the pots with a first component of the food product;
    (b) continuously forming a plurality of connected trays having side walls from an advancing thermoplastic strip such that the thermoplastic strip is not severed between said trays and providing an annular rib within each tray, each said annular rib spaced from the side walls of each of said trays and having an inner periphery defined by the annular rib of sufficient size to receive and surround a formed pot;
    (c) advancing said strip and each formed tray and filling each tray about the outer periphery of the rib between said rib and said sidewall with a second component of the food product;
    (d) covering each filled pot by continuously advancing a continuous cover strip such that the plurality of pots are positioned on and sealed to said cover strip in a position such that each pot is capable of being disposed within the inner periphery of the annular rib of each of said trays;
    (e) advancing in synchronism the cover strip and each filled, sealed pot and each tray such that each filled, sealed pot becomes positioned within the inner periphery of the annular rib of each filled tray;
    (f) sealing the cover strip to each of the trays to form a plurality of sealed containers; and
    (g) severing each container from the thermoplastic strip and from the cover strip and trimming waste from the sealed containers.

2. The method according to claim 1, wherein after the cover strip has been applied to the pot, further comprising advancing the cover strip and each of said filled, sealed pots through pasteurization means.

3. A method according to claim 1 wherein the first food product component is a garnish and the second food component is a powder mass.

4. A method according to claim 3 further comprising compacting the garnish before filling it in the pots.

5. The method according to claim 1, wherein the annular rib is centrally disposed within the tray and the pot is centrally disposed within the area of the cover strip.

* * * * *